Sept. 21, 1954  H. F. HOLM ET AL  2,689,548
ARRANGEMENT OF CONTROL VALVES
Filed May 1, 1953
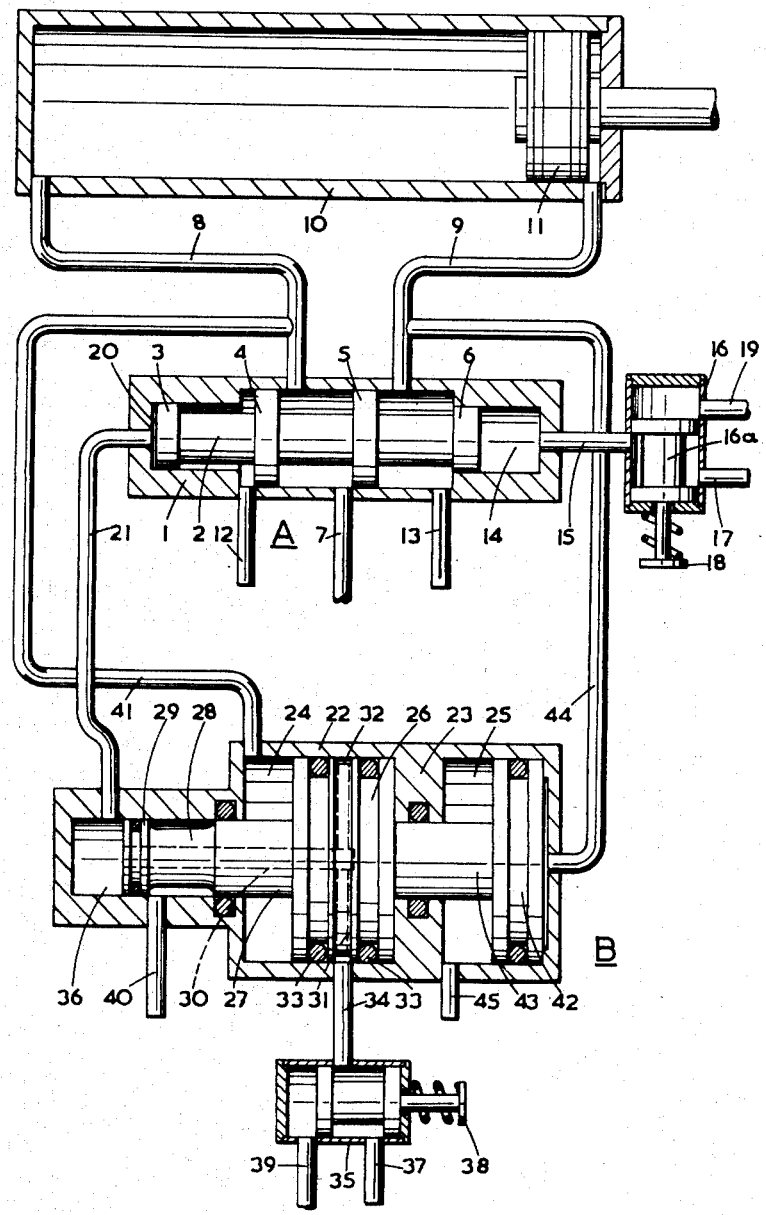
INVENTORS
H. F. HOLM &
N. F. HOPPE
by Mawhinney & Mawhinney
Attys.

Patented Sept. 21, 1954

2,689,548

UNITED STATES PATENT OFFICE 2,689,548

ARRANGEMENT OF CONTROL VALVES

Hans Feser Holm and Nils Ferdinand Hoppe, Stockholm, Sweden, assignors to Smallpeice Limited, Richmond, England Application May 1, 1953, Serial No. 352,537

6 Claims. (Cl. 121—38)

This invention relates to a control valve, for controlling a double-acting, pressure-responsive device, of the kind in which a valve member, slidable in a cylinder, is arranged to be displaced by a pressure medium applied alternately to cylinder chambers at the ends of the valve member. Our copending patent application Serial No. 352,536 also relates to a control valve of this kind.

Such a valve is used, for example, for supplying air pressure alternately to output circuits leading to the ends of a cylinder with a double-acting piston therein, the latter being used for starting or stopping eccentric presses, motors or the like.

The main object of the invention is to arrange for two impulse valves to actuate the control valve, one actuating it in one direction and the other actuating it in the reverse direction even if the impulse member of the first valve has not been released.

The control means of the invention is characterised in that one of the cylinder chambers at the ends of the valve member is coupled to a valve casing containing a movable slide which in the starting position supplies pressure medium to the said one cylinder chamber on the operation of one of the impulse valves placed between the valve casing and a source of the pressure medium, and in that a conduit connects one of the outlets from the control valve with one end of the valve casing so that, after movement of the valve member of the control valve to its opposite position, pressure medium is supplied for moving the slide in the valve casing to a position in which communication between the presure medium source and the said cylinder chamber is blocked, whereby the return of the valve member of the control valve to the starting position can be effected, by operation of the other impulse valve placed to connect the pressure medium source to the other cylinder chamber of the control valve, even if the first impulse valve is held in the open position.

One arrangement according to the invention is diagrammatically illustrated in the accompanying drawing.

One of the control valves, of known construction and indicated generally by the letter A, comprises a cylindrical casing 1 in which works a movable valve member consisting of a piston rod 2 with pistons 3, 4, 5 and 6. A supply conduit 7, from a pressure supply (usually air under pressure), enters the valve casing in a position between the two inner pistons 4 and 5, and there are two outlet conduits, 8 and 9, from the valve casing to the opposite ends of a working cylinder 10 containing a double-acting piston 11. These outlet conduits are so arranged that one of them, dependently on the position of the movable valve member, communicates with the supply conduit 7 whilst the other communicates with an outlet 12 or 13, as appropriate, from the valve casing. The piston 6 acts in a cylinder 14 which normally communicates, through a conduit 15 and a three-way valve 16, with an outlet 17 to the atmosphere. The valve 16 has a movable member 16a fast with a press-knob 18 which latter, when pressed against spring action, connects the conduit 15 instead to a conduit 19 leading from a pressure supply. The piston 3 works in a similar cylinder 20 which is at the opposite end of the casing and, in accordance with the invention, it communicates through a conduit 21 with a second control valve B.

The latter includes a valve casing 22 divided by a partition 23 into two cylindrical chambers 24 and 25, of which the one 24 (i. e., at the left of the figure) has an outer extension of reduced diameter. In the chamber 24 is an hermetically sealing piston 26 with a piston rod 27 extending slidably and sealingly into the reduced diameter extension. The piston rod 27, inwardly of its outer end, has a neck 28 and, at its outer end, a piston 29. An axial duct 30 in the piston rod 27 communicates with one or more radial ducts 31 in the piston 26, and the ducts 31 lead into a peripheral groove 32, of the piston 26, arranged between two packing rings 33 let into the piston surface.

A conduit 34 from a three-way valve 35 enters the valve casing 22 and communicates, through the groove 32 and ducts 31 and 30, with a chamber 36 beyond the outer end of the piston 29 when the piston 26 lies against the wall 23, and in this position the conduit 21 establishes a communication between the chamber 36 and the cylinder 20 of the control valve A.

The three-way valve 35 is of the same construction as the valve 16—it normally maintains a communication with the outer air through an outlet 37 and, on pressing a press-knob 38 against a bias, the conduit 34 is connected to a conduit 39 from the pressure supply.

When the piston 29 lies against the end wall of the chamber 36, the conduit 21 is placed in communication, through the annular chamber about the neck 28 of the piston rod 27, with an outlet 40 leading to the outer air. A conduit 41 connects the chamber 24 at the left (i. e., in the figure) of the piston 26 to the outlet 8 from control valve A.

In the chamber 25 at the right of the partition 23 there is another piston 42, the piston rod 43 of which is sealingly slidable in a central hole of the wall 23. When the piston 42 is at the right (i. e., as shown) the remote end of the piston rod 43 is flush with the left side of the partition 23 and can rest against the piston 26 when the latter is at the right-hand limit of its travel. A conduit 44 connects the chamber 25 on the right side of the piston 42 with the outlet 9 from control valve A, and the chamber 25 on the left side of the piston 42 communicates with the atmosphere through an outlet 45.

The arrangement described functions in the following manner. Assuming that the parts are in the positions shown, by depressing the knob 38 of the valve 35 air pressure is fed through the conduit 34, the groove 32, the ducts 31 and 30, the chamber 36 and the conduit 21 to the cylinder 20 so as to move the piston rod 2 of the control valve A to the right. In these conditions the conduit 7 supplies the pressure medium through the conduit 9 to the cylinder 10 for urging the piston 11 to the left. When this movement of the piston 11 is completed the pressure behind it in the cylinder 10 builds up to its full value, and this increase in pressure is applied through the conduit 44 to the right side of piston 42 of control valve B. Initially both sets of pistons in the valve casing 22 will be held in their starting positions by the pressure in the chamber 36 acting on the piston 29, but when the pressure in the conduit 44 reaches a certain value, the force acting on the considerably larger right-hand side of the piston 42 is sufficient to move the set of pistons to the left.

When this occurs the communication between the conduit 34 and the peripheral groove 32 of the piston 26 is cut off, the air in the chamber 24 leaves through the conduit 41, and the pressure in the cylinder 20 is relieved because the conduit 21 then communicates with the outlet 40. With the piston 26 at its leftward limit, the conduit 34 leads to the part of the chamber 24 at its right, and, since the knob 38 is still being pressed, excess pressure is built up for holding the piston 26 in its new position independently of the piston rod 43.

Whether or not the press-knob 38 is still kept pressed, the piston rod 2 can now be returned to the position shown by pressing the press-knob 18, and this will cause the working piston 11 to return to the right-hand end of the cylinder 10. When this occurs the pressure in the chamber on the right side of the piston 42 is discharged through the conduit 44 and the outlet 13, and this enables the pressure developed in the chamber on the right side of the piston 26, and acting on the end surface of the piston rod 43, to move that piston rod with the piston 42 to the right. The same pressure mentioned above keeps the piston 26 in its leftward position even when the same large specific pressure is built up at the left of the piston 26 through the conduit 41 (which, in these conditions, is in communication with the air pressure supply conduit 7) owing to the presence of the piston rod 27 resulting in the total force acting on the left side of the piston 26 being less than that acting on the right side of the piston.

When the press-knob 38 of the three-way valve 35 is released (which is assumed to happen as soon as the working piston 11 returns to the right of the cylinder 10) the pressure in the chamber on the right of the piston 26 is exhausted through the outlet 37 and permits the piston 26, due to the pressure on its left side, to move back to the right (i. e., to the position shown in the drawing). This completes a working cycle.

What we claim as our invention and desire to secure by Letters Patent of the United States is:

1. Valve means for controlling a double-acting pressure-responsive device, including first and second control valves each with movable members and each with a cylindrical chamber at each end, said movable members acting piston-wise in said cylindrical chambers, a source of pressure medium, and two impulse valves, the cylinder chamber at one end of said first valve communicating with the cylinder chamber at one end of said second valve, one of said impulse valves operable to connect the communication between said cylinder chambers at the said one ends of said first and second valves with said source of pressure medium for operating the movable member of said first valve to an extreme position in which a supply of the pressure medium to one end of the pneumatic device is provided through an outlet of said first valve, the said other cylindrical chamber of said second valve being of larger diameter than the said one end thereof, the said outlet communicating with the said other cylinder chamber of said second valve for said pressure medium to act on the larger diameter piston end of the movable member thereof for operating said movable member of said second valve to cut off the supply of pressure medium to the said cylinder chamber of said first valve and the other of said impulse valves operable to connect said source of pressure medium to the cylinder chamber at the other end of said first valve for returning the movable member of said first valve to its initial position, said movable member of said first valve in those conditions establishing a communication between said source and the movable member of said second valve for restoring it to its initial position.

2. Valve means, according to claim 1, in which the movable member of said second valve has a through passage, formed by axial and radial ducts, through which the first-mentioned cylinder chamber of said first valve communicates with the pressure medium source in one extreme position of the movable member of said second valve, the movable member of the latter valve, when at its opposite extreme position, cutting off the supply and connecting the said first-mentioned cylinder chamber of said first valve to exhaust.

3. An arrangement, according to claim 2, including a second movable member, in said second valve, arranged, when the movable member of said first valve is moved by the pressure medium through the said through-passage, to be subjected to the pressure which builds up in one of the outlets of said first valve whereby to move the first said movable member of said second valve to a position in which the said through-passage is blocked.

4. An arrangement, according to claim 2, in which the said first-mentioned movable member of said second valve includes two pistons of different diameters connected by a piston rod, an axial duct extending through the smaller diameter one, and a radial duct in the larger diameter one whereby, when the two pistons have been moved bodily to cut off the communication to the said first-mentioned cylinder chamber of said first valve, the pressure medium is applied to the remote surface of the larger of said two pistons in order to prevent reverse movement of the pistons until the next operation.

5. Valve means for actuating a double-acting pressure-responsive device, including a first control valve having a cylinder with an axially-movable valve member therein, said cylinder connected to a pressure medium supply and to two outlet passages so that said outlet passages are selectively supplied with the pressure medium dependently upon the position of the valve member while the other outlet passage is connected to exhaust, cylindrical chambers at the ends of said cylinder, one of said chambers connected to an impulse valve whereby this chamber may be connected to the source of medium pressure to actuate the valve member in one direction, a second control valve having a valve casing divided by a partition and having a movable slide, on one side of the partition, fast with a waisted plunger operable in a cylindrical chamber at the adjacent end of the valve casing, a conduit connecting the end of the latter cylindrical chamber with the other cylindrical chamber of said first control valve, the cylindrical chamber of said second control valve being connected to exhaust in the vicinity of the waist of the waisted plunger, said movable slide having passages in it connecting the end of said cylindrical chamber of said second control valve with a peripheral groove of the movable slide, an impulse valve connected to said valve casing in the vicinity of the peripheral groove of said movable slide for one position thereof, said impulse valve normally being connected to exhaust but, on operation, serving to connect said pressure medium to said peripheral groove and thence to said cylindrical chamber of said second control valve and by said conduit to said other cylindrical chamber of said first control valve whereby to move the valve member of said cylinder in the other direction, when the associated impulse valve associated with said first control valve is not actuated, thereby supplying the other of said outlets with the pressure medium and placing the previously-supplied outlet passage to exhaust, a conduit connecting said last-mentioned outlet passage to the end of said valve casing adjacent the cylindrical chamber of said second control valve, a plunger on the other side of said partition with a stem extending through a hole in the partition and adapted to bear on said valve member, and a conduit connecting said other outlet passage to the end of the chamber in which said last-mentioned plunger works.

6. Valve means for actuating a double-acting pressure-responsive device, including a first control valve having a cylinder with an axially-movable valve member therein, said cylinder connected to a pressure medium supply and to two outlet passages so that said outlet passages are selectively supplied with the pressure medium dependently upon the position of the valve member while the other outlet passage is connected to exhaust, cylindrical chambers at the ends of said cylinder, one of said chambers connected to an impulse valve whereby this chamber may be connected to the source of pressure medium to actuate the movable member of said control valve in one direction, a second control valve having a valve casing with cylindrical chambers at its ends, a second impulse valve operable in a starting position of said second control valve to connect said pressure medium to one of the cylindrical chambers of said second control valve and by a conduit to said other cylindrical chamber of said first control valve whereby to move the movable member of said first control valve in the other direction when the associated impulse valve associated with the said first control valve is not actuated, thereby supplying the other of said outlets with the pressure medium and placing the previously-supplied outlet passage to exhaust, a conduit connecting said other outlet passage to the cylindrical chamber at the other end of said second control valve, said other cylindrical chamber of said second valve being of larger diameter than said one end thereof, and a communication between said other end of said pneumatic device and said second control valve for restoring said second valve to its initial position.

References Cited in the file of this patent

UNITED STATES PATENTS

| Number | Name | Date |
|---|---|---|
| 2,223,792 | Muir | Dec. 3, 1940 |
| 2,394,074 | Kilian | Feb. 5, 1946 |
| 2,402,212 | Shaff | June 18, 1946 |
| 2,652,812 | Fenzl | Sept. 22, 1953 |